United States Patent
Konishi et al.

(10) Patent No.: US 9,469,570 B2
(45) Date of Patent: Oct. 18, 2016

(54) CONCRETE COMPOSITION

(71) Applicant: Shin-Etsu Chemical Co., Ltd., Tokyo (JP)

(72) Inventors: Hidekazu Konishi, Joetsu (JP); Tsutomu Yamakawa, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/699,142

(22) Filed: Apr. 29, 2015

(65) Prior Publication Data

US 2015/0315080 A1 Nov. 5, 2015

(30) Foreign Application Priority Data

Apr. 30, 2014 (JP) ................. 2014-093585
Jun. 25, 2014 (JP) ................. 2014-129774

(51) Int. Cl.
*C04B 28/04* (2006.01)
*C04B 24/38* (2006.01)
*C04B 28/02* (2006.01)
*C04B 103/00* (2006.01)

(52) U.S. Cl.
CPC ............. *C04B 28/04* (2013.01); *C04B 24/383* (2013.01); *C04B 28/02* (2013.01); *C04B 2103/0082* (2013.01); *C04B 2103/0083* (2013.01)

(58) Field of Classification Search
CPC ..... C04B 14/02; C04B 24/383; C04B 28/02; C04B 28/04; C04B 2103/0082; C04B 2103/0083; C04B 16/02; C04B 24/386
USPC .................................. 106/730, 805
See application file for complete search history.

(56) References Cited

U.S. PATENT DOCUMENTS

| | | | |
|---|---|---|---|
| 2009/0158965 A1* | 6/2009 | Andersen ............... | C04B 28/02 106/705 |
| 2009/0158970 A1 | 6/2009 | Andersen et al. | |
| 2010/0229761 A1 | 9/2010 | Fabbris | |
| 2011/0203488 A1* | 8/2011 | Xenopoulos .......... | C04B 24/383 106/805 |

FOREIGN PATENT DOCUMENTS

| | | |
|---|---|---|
| JP | 5-213651 A | 8/1993 |
| JP | 9-25149 A | 1/1997 |
| JP | 9-40447 A | 2/1997 |
| JP | 2009-155184 A | 7/2009 |
| WO | 2010/055214 A1 | 5/2010 |

OTHER PUBLICATIONS

European Search Report dated Nov. 4, 2015, issued in couterpart Application No. 15165642.8-1351/2939990 (6 pages).

* cited by examiner

*Primary Examiner* — Anthony J Green
(74) *Attorney, Agent, or Firm* — Westerman, Hattori, Daniels & Adrian, LLP

(57) ABSTRACT

A concrete composition is provided comprising a nonionic water-soluble cellulose ether, water, cement, a fine aggregate, and a coarse aggregate. The nonionic water-soluble cellulose ether has a 2 wt % aqueous solution viscosity of 3-1,000 mPa·s at 20° C. The concrete composition has a static slump/remix slump ratio of at least 0.50.

5 Claims, No Drawings

CONCRETE COMPOSITION

CROSS-REFERENCE TO RELATED APPLICATION

This non-provisional application claims priority under 35 U.S.C. §119(a) on Patent Application Nos. 2014-093585 and 2014-129774 filed in Japan on Apr. 30, 2014 and Jun. 25, 2014, respectively, the entire contents of which are hereby incorporated by reference.

TECHNICAL FIELD

This invention relates to a concrete composition, and more particularly, to a concrete composition which is resistant to segregation such as reduction of bleeding and prevents any loss of flow with time.

BACKGROUND ART

In accordance with the progress of hydration reaction of cement, concrete gradually loses flow with the lapse of time after mixing. This suggests that concrete loses applicability and workability with the lapse of time. With respect to pumping of concrete through a feed conduit, a problem arises if the pumping operation is interrupted on account of an operator break or a change of course and restarted later. Since the concrete in the feed conduit reduces its flow during the quiescent time, the pumping pressure sharply rises at the restart of pumping. In case of a further flow reduction, the feed conduit can be clogged with the concrete.

In the prior art, admixtures are added to hydraulic concrete compositions for improving their flow. Known admixtures are water-reducing agents and high-range water-reducing agents including lignin sulfonic acid base water-reducing agents, polycarboxylic acid base water-reducing agents, naphthalene base water-reducing agents (e.g., naphthalenesulfonic acid/formaldehyde condensate salts), and melamine base water-reducing agents (e.g., melamine sulfonic acid/formaldehyde condensate salts). Although these admixtures are effective for improving flow, they suffer from a substantial slump loss, i.e., loss of flow with time.

For preventing physical properties of freshly mixed concrete from changing with time, it is a common practice to select the type and amount of a slump retainer, set retarder and set accelerator. For example, Patent Document 1 discloses a combination of a dispersant with a set accelerator such as calcium nitrite. Patent Documents 2 and 3 disclose a combination of a slump retainer such as oxycarboxylic acids or salts thereof with a set retarder such as saccharides or saccharide alcohols.

The method of Patent Document 1 is difficult to meet both segregation resistance and slump loss, since the effect is largely affected by the ratio of two admixtures. The methods of Patent Documents 2 and 3 provide concrete with a low slump loss after 60 minutes of intermittent mixing. However, once the working is interrupted, pumping at the restart of working may become difficult.

CITATION LIST

Patent Document 1: JP-A H05-213651 (EP 0537872)
Patent Document 2: JP-A H09-025149
Patent Document 3: JP-A H09-040447

DISCLOSURE OF INVENTION

An object of the invention is to provide a concrete composition comprising a cellulose ether which imparts an appropriate consistency to concrete and has a sufficient lubricity to prevent aggregates from being entangled together, for thereby mitigating a loss of flow with the lapse of time.

The inventors have found that the outstanding problems can be solved by using a cellulose ether having a desired aqueous solution viscosity and imparting an appropriate slump ratio to concrete.

The invention provides a concrete composition comprising a nonionic water-soluble cellulose ether, water, cement, a fine aggregate, and a coarse aggregate, wherein the nonionic water-soluble cellulose ether has a 2 wt % aqueous solution viscosity of 3 to 1,000 mPa·s at 20° C. and the concrete composition has a slump ratio (A/B) of at least 0.50.

Preferably, the concrete composition, immediately after mixing, has a slump value of 5 to 24 cm as measured according to JIS A 1101.

Preferably, the nonionic water-soluble cellulose ether is added in an amount of 0.01 to 5 kg per cubic meters of the concrete composition. Also preferably, it is hydroxypropyl methyl cellulose, hydroxyethyl methyl cellulose or hydroxyethyl cellulose.

Preferably, the concrete composition has a water/cement ratio in the range of 35 to 72% by weight.

ADVANTAGEOUS EFFECTS OF INVENTION

The concrete composition of the invention is resistant to segregation (or ingredient separation) and experiences a minimal loss of flow after a certain period of static aging and a minimal change with time of pumping ability during working.

DESCRIPTION OF PREFERRED EMBODIMENT

The invention provides a concrete composition comprising a nonionic water-soluble cellulose ether, water, cement, a fine aggregate, and a coarse aggregate as essential ingredients.

According to the invention, the nonionic water-soluble cellulose ether forms a 2 wt % aqueous solution having a viscosity of 3 to 1,000 mPa·s, preferably 20 to 800 mPa·s, and more preferably 50 to 500 mPa·s, as measured at 20° C. by a B-H viscometer at 20 rpm. If the 2 wt % aqueous solution viscosity at 20° C. of cellulose ether exceeds 1,000 mPa·s, it suggests too high a consistency, adversely affecting the flow immediately after mixing. If the viscosity is less than 3 mPa·s, bleeding occurs, aggregates settle down, and the strength after setting becomes non-uniform.

Examples of the nonionic water-soluble cellulose ether used herein include hydroxypropyl methyl cellulose, hydroxyethyl methyl cellulose, and hydroxyethyl cellulose.

The hydroxypropyl methyl cellulose should preferably have a degree of methyl substitution of 1.0 to 2.0, more preferably 1.2 to 1.8, and a molar substitution of hydroxypropyl of 0.05 to 0.45, more preferably 0.10 to 0.40. The hydroxyethyl methyl cellulose should preferably have a degree of methyl substitution of 1.0 to 2.0, more preferably 1.2 to 1.8, and a molar substitution of hydroxyethyl of 0.05 to 0.45, more preferably 0.10 to 0.40. The hydroxyethyl cellulose should preferably have a molar substitution of hydroxyethyl of 0.05 to 3.00, more preferably 0.10 to 2.90.

Notably, DS refers to "degree of substitution" and MS to "molar substitution". With respect to DS of alkyl and MS of hydroxyalkyl, measurement may be made by the analysis of DS of hypromellose (hydroxypropyl methyl cellulose) prescribed in the Japanese Pharmacopoeia, 16th Edition.

Preferably, the nonionic water-soluble cellulose ether is added in an amount of 0.01 to 5 kg per cubic meters of the concrete composition, more preferably 0.05 to 3 kg/m$^3$, and even more preferably 0.1 to 2 kg/m$^3$. If the addition amount exceeds 5 kg, a loss of flow due to too high consistency and the set retarding effect of the nonionic water-soluble cellulose ether may invite a lowering of initial age strength. If the addition amount is less than 0.01 kg, problems may arise including insufficient segregation resistance, bleeding, aggregate settlement, non-uniform strength after setting, and poor durability.

Examples of the cement used herein include normal Portland cement, high-early-strength Portland cement, moderate heat Portland cement, Portland blast-furnace slag cement, silica cement, fly ash cement, alumina cement, and ultra-high-early-strength Portland cement.

The concrete composition preferably has a water/cement ratio in the range of 35 to 72 wt %, more preferably 45 to 63 wt %. If the water/cement ratio exceeds 72 wt %, segregation may occur, or setting be substantially retarded. If the ratio is less than 35 wt %, flow retention may become insufficient even when a water-reducing agent is used.

The concrete composition contains a coarse aggregate and a fine aggregate as the aggregate. Suitable coarse aggregates include river gravel, land gravel, pit gravel, and crushed stone, and suitable fine aggregates include river sand, land sand, pit sand, and crushed sand. Of these, river gravel and river sand are preferably used in order for the concrete composition to flow. The particle size of the fine aggregate is preferably up to 5 mm. The coarse aggregate has a larger particle size of preferably up to 40 mm, more preferably up to 25 mm.

An appropriate amount of the aggregate (coarse aggregate and fine aggregate) added is 1,000 to 2,300 kg per cubic meters of the concrete composition, more preferably 1,150 to 2,150 kg/m$^3$. An appropriate amount of the fine aggregate added is 400 to 1,100 kg/m$^3$, more preferably 500 to 1,000 kg/m$^3$ of concrete. An appropriate amount of the coarse aggregate added is 600 to 1,200 kg/m$^3$, more preferably 650 to 1,150 kg/m$^3$ of concrete. A sand-coarse aggregate ratio (% by volume) in the total aggregate is preferably 33 to 51%, more preferably 35 to 50%, and even more preferably 37 to 49% by volume for flow or sufficient strength.

In the practice of the invention, a water-reducing agent may be added, if necessary, for obtaining good flow retention with a low content of water.

Of the water-reducing agents, polycarboxylic acid base water-reducing agents include polycarboxylic acid ethers, polycarboxylic acid ester/crosslinked polymer composites, polycarboxylic acid ether/oriented polymer composites, polycarboxylic acid ether/highly modified polymer composites, polyether carboxylic acid polymers, maleic acid copolymers, maleate copolymers, maleic acid derivative copolymers, carboxyl-containing polyethers, sulfone-terminated polycarboxylic acid-containing multi-component polymers, polycarboxylic acid base graft copolymers, polycarboxylic acid base compounds, and polycarboxylic acid ether base polymers. Melamine base water-reducing agents include melamine sulfonic acid-formaldehyde condensates, melamine sulfonic acid salt condensates, and melamine sulfonic acid salt-polyol condensates. Lignin base water-reducing agents include lignin sulfonic acid salts and derivatives thereof. Inter alia, polycarboxylic acid base water-reducing agents are preferred for water reducing effect, flow and flow retention.

Although the amount of the water-reducing agent added may be determined in accordance with its type and grade, an appropriate amount is 0.01 to 5 parts by weight per 100 parts by weight of the cement. While the water-reducing agent is used for obtaining high flow with as low a water content as possible, an extremely small amount of the water-reducing agent may be ineffective. An excessive amount of the water-reducing agent may induce bleeding and segregation, typically aggregate settlement, and hence, a loss of strength.

In the concrete composition, an air entraining admixture may be added, if necessary, for gaining an appropriate content of air for rendering the concrete durable. Suitable AE admixtures include anionic surfactants, cationic surfactants, nonionic surfactants, and amphoteric surfactants. Exemplary of the anionic surfactant are carboxylic acid, sulfuric acid ester, sulfonic acid, and phosphoric acid ester type surfactants. Exemplary of the cationic surfactant are amine salt, primary amine salt, secondary amine salt, tertiary amine salt, and Quaternary amine salt type surfactants. Exemplary of the nonionic surfactant are ester, ester-ether, ether and alkanol amide type surfactants. Exemplary of the amphoteric surfactant are amino acid and sulfo-betaine type surfactants. Of these AE admixtures, anionic surfactants are preferably selected for efficient air entrainment.

An appropriate amount of the AE admixture is 0.0001 to 1 part, more preferably 0.001 to 0.1 part by weight per 100 parts by weight of the cement. More than 1 part of the AE admixture may result in a concrete with an excessive air content and hence low strength. Less than 0.0001 part of the AE agent may fail to entrain a sufficient amount of air to improve frost resistance (freezing/thawing resistance).

In the concrete composition, a defoamer may be used, if necessary, for preventing an excessive amount of air entrained upon mixing from acting to reduce strength. Suitable defoamers include oxyalkylene, silicone, alcohol, mineral oil, fatty acid, and fatty acid ester base defoamers. Examples of the oxyalkylene base defoamer include polyoxyalkylenes such as (poly)oxyethylene-(poly)oxypropylene adducts; (poly)oxyalkylene alkyl ethers such as diethylene glycol heptyl ether, polyoxyethylene oleyl ether, polyoxypropylene butyl ether, polyoxyethylene polyoxypropylene 2-ethylhexyl ether, and oxyethylene oxypropylene adducts to higher alcohols of 8 or more carbon atoms or secondary alcohols of 12 to 14 carbon atoms; (poly)oxyalkylene (alkyl)aryl ethers such as polyoxypropylene phenyl ether and polyoxyethylene nonyl phenyl ether; acetylene ethers obtained from addition polymerization of alkylene oxides to acetylene alcohols such as 2,4,7,9-tetramethyl-5-decyne-4,7-diol, 2,5-dimethyl-3-hexyne-2,5-diol, and 3-methyl-1-butyn-3-ol; (poly)oxyalkylene fatty acid esters such as diethylene glycol oleic acid ester, diethylene glycol lauric acid ester, and ethylene glycol distearic acid ester; (poly)oxyalkylene sorbitan fatty acid esters such as polyoxyethylene sorbitan monolauric acid ester and polyoxyethylene sorbitan trioleic acid ester; (poly)oxyalkylene alkyl (aryl) ether sulfuric acid ester salts such as polyoxypropylene methyl ether sodium sulfate and polyoxyethylene dodecyl phenol ether sodium sulfate; (poly)oxyalkylene alkyl phosphoric acid esters such as (poly)oxyethylene stearyl phosphoric acid ester; (poly)oxyalkylene alkyl amines such as polyoxyethylene lauryl amine; and polyoxyalkylene amides. Examples of the silicone base defoamer include dimethylsilicone oil, silicone paste, silicone emulsions, organic modified polysiloxanes (e.g., polyorganosiloxanes such as dimethylpolysiloxane), and fluoro-silicone oil. Examples of the alcohol base defoamer include octyl alcohol, 2-ethylhexyl alcohol, hexadecyl alcohol, acetylene alcohol, and glycol. Examples of the mineral oil base defoamer include kerosine and liquid paraffin. Examples of the fatty acid base defoamer include oleic acid, stearic acid, and alkylene oxide adducts thereof. Examples of the fatty acid ester base defoamer include glycerol monolicinolate, alkenyl succinic acid derivatives, sorbitol monolaurate, sorbitol trioleate, and natural wax. Of these, oxyalkylene base defoamers are preferred for defoaming ability.

An appropriate amount of the defoamer added is 0.001 to 0.5 part, more preferably 0.01 to 0.2 part by weight per 100 parts by weight of the cement. With more than 0.5 part of the defoamer, no further improvement in defoaming effect may be observed. Less than 0.001 part of the defoamer may fail to eliminate entrained air and lead to a strength drop.

If desired, a set accelerator such as calcium chloride, lithium chloride or calcium formate, and a set retarder such as sodium citrate or sodium gluconate may be added to the concrete composition. While these agents serve to control the physical properties of freshly mixed concrete, a suitable agent may be selected for a particular purpose and added in customary amounts.

Also, an expanding agent may be added to the concrete composition, if necessary, for preventing shrinkage crazing on curing and drying, and for preventing crazing concomitant with thermal stresses by the hydration heat of cement. Suitable expanding agents include hauyne and lime base agents, and any suitable agent may be selected for a particular purpose and used in customary amounts.

It is preferred from the aspect of segregation or flow that the concrete composition have a slump value immediately after mixing of 5 to 24 cm, more preferably 8 to 21 cm, and even more preferably 10 to 18 cm, according to JIS A 1101. The slump value of the freshly mixed concrete composition may be controlled to a range of 5 to 24 cm, preferably by adjusting the unit weight of cement, unit weight of water, amount of water-reducing agent and the like although the control means is not limited thereto.

In pumping a concrete composition through a feed conduit, a problem arises if the pumping operation is interrupted on account of an operator break or a change of working course and restarted later. The pumping pressure may sharply rise at the restart of pumping and still worse, the feed conduit can be clogged with the concrete because the concrete in the feed conduit has reduced its flow during the quiescent time. This problem is solved when the concrete composition has a slump ratio (A/B) of at least 0.50, preferably at least 0.60, and more preferably at least 0.70. The upper limit of slump ratio (A/B) is 1.00.

The slump ratio (A/B) is determined by the following slump test. When a concrete composition is aged static for 30 minutes after mixing, it shows a static slump value A. When the 30-minute aged concrete composition is remixed for 30 seconds, it shows a remix slump value B. A concrete composition having a slump ratio A/B of less than 0.5 is less flowable in the static state, suggesting that once pumping is interrupted, an extra step of remixing is necessary at the restart of pumping.

A slump ratio (A/B) of at least 0.50 may be achieved, preferably by controlling the amount of the nonionic water-soluble cellulose ether on the basis of its 2 wt % aqueous solution viscosity, typically by increasing the amount of cellulose ether added if the viscosity is low and reducing the amount of cellulose ether added if the viscosity is high.

EXAMPLE

Examples of the invention are given below by way of illustration and not by way of limitation. In the following examples, % is by weight unless otherwise stated.
Ingredients
(1) Cement (C):
  normal Portland cement (Taiheiyo Cement Co., Ltd.)
  Density 3.16 g/cm$^3$
(2) Fine aggregate (S):
  sand with maximum particle size 5 mm,
  from Shimonigorigawa, Myokou City, Niigata, Japan
  Water absorption 2.29%
  Saturated surface-dry density 2.57 g/cm$^3$
  Fineness modulus 2.81%
(3) Coarse aggregate (G):
  crushed stone with maximum particle size 25 mm,
  from Shimonigorigawa, Myokou City, Niigata, Japan
  Water absorption 2.05%
  Saturated surface-dry density 2.61 g/cm$^3$
  Fineness modulus 6.62%
(4) Water (W): tap water
(5) Nonionic water-soluble cellulose ether (CE)
(6) Water-reducing agent:
  Chupol HP-8 (Takemoto Oil & Fat Co., Ltd.),
  polycarboxylic acid base water-reducing agent
(7) AE admixture: Micro-air 303A (BASF, anionic surfactant)
(8) Defoamer:
  SN-Defoamer 14HF
  (San Nopco Ltd., oxyalkylene base defoamer)

TABLE 1

| | Maximum size of coarse aggregate | Water/cement ratio (W/C), | Sand-coarse aggregate ratio* | Unit weight, kg/m$^3$ | | | |
|---|---|---|---|---|---|---|---|
| | | | | Water (W) | Cement (C) | Fine aggregate | Coarse aggregate |
| Formulation 1 | 25 | 53.9 | 44.1 | 174 | 323 | 768 | 988 |
| Formulation 2 | 25 | 57.3 | 42.8 | 152 | 265 | 789 | 1,071 |
| Formulation 3 | 25 | 62.5 | 48.3 | 185 | 296 | 838 | 910 |

*Sand-coarse aggregate ratio (%) = (fine aggregate)/(fine aggregate + coarse aggregate) × 100% by volume

TABLE 2

| Admixture | | | |
|---|---|---|---|
| Cellulose ether (g/m$^3$) | Water-reducing agent (C × %) | AE admixture (C × %) | Defoamer (C × %) |
| variable | variable | variable | variable |

Note:
C × % is % by weight based on cement (C)

TABLE 3

| Sample No. | Type | DS | MS | 2 wt % aqueous solution viscosity (mPa·s) |
|---|---|---|---|---|
| 1 | HEMC | 1.5 | 0.25 | 460 |
| 2 | HPMC | 1.4 | 0.41 | 910 |
| 3 | HPMC | 1.8 | 0.15 | 140 |
| 4 | HPMC | 1.9 | 0.25 | 16 |
| 5 | HEC | — | 2.10 | 670 |
| 6 | HPMC | 1.4 | 0.18 | 2 |
| 7 | HEMC | 1.5 | 0.32 | 1,200 |

HPMC: hydroxypropyl methyl cellulose
HEMC: hydroxyethyl methyl cellulose
HEC: hydroxyethyl cellulose Concrete Mixing A 100-L twin-shaft compulsion mixer was charged with cement, fine aggregate, coarse aggregate, defoamer, and nonionic water-soluble cellulose ether (shown in Table 3) in accordance with the concrete formulation shown in Tables 1 and 2, followed by 30 seconds of dry mixing. Then water, water-reducing agent, and AE admixture were fed. The ingredients were mixed at 60 rpm for 90 seconds, obtaining a concrete composition. The volume of mixed concrete per batch was 70 L. Notably, the AE admixture and defoamer were used, if necessary, so as to provide the concrete composition with an air content of 4.5±1.5%.

Tests

1. Concrete Temperature

The temperature of ingredients was adjusted such that the concrete composition had a temperature of 20±3° C. at the end of mixing.

2. Air content tested according to JIS A 1128.

3. Slump test 3-1 Slump immediately after mixing tested according to JIS A 1101

3-2 Slump ratio

A slump ratio (A/B) is computed by dividing a static slump value (A) by a remix slump value (B). In the slump test according to JIS A 1101, a slump cone was filled with freshly mixed concrete. The concrete was aged static for 30 minutes, and measured for slump, obtaining a static slump value (A). After the concrete was aged for 30 minutes from mixing, 50 L of the concrete was remixed on a 100-L twin-shaft compulsion mixer at 60 rpm for 30 seconds. The remixed concrete was measured for slump, obtaining a remix slump value (B). The concrete was at a temperature of 20±3° C. during static aging.

4. Bleeding tested according to JIS A 1123. A low bleeding value indicates better segregation resistance.

The test results are shown in Tables 4 and 5.

TABLE 4

| Ingredients | Example | | | | | | | | | |
|---|---|---|---|---|---|---|---|---|---|---|
| | 1 | 2 | 3 | 4 | 5 | 6 | 7 | 8 | 9 | 10 |
| Formulation | 1 | 1 | 1 | 1 | 1 | 1 | 1 | 1 | 2 | 3 |
| Type of cellulose ether | No. 1 | No. 2 | No. 3 | No. 4 | No. 5 | No. 4 | No. 1 | No. 1 | No. 3 | No. 5 |
| Amount of cellulose ether (g/m$^3$) | 600 | 500 | 1,000 | 2,500 | 700 | 4,500 | 600 | 600 | 1,000 | 700 |
| Amount of water-reducing agent (%) | 0.5 | 0.5 | 0.5 | 0.5 | 0.5 | 0.5 | 0.1 | 0.6 | 0.5 | 0.5 |
| Amount of AE admixture (%) | 0.008 | 0.008 | — | — | 0.01 | — | 0.008 | 0.008 | — | 0.01 |
| Amount of defoamer (%) | — | — | 0.02 | 0.04 | — | 0.06 | — | — | 0.02 | — |
| Results | | | | | | | | | | |
| Temperature (° C.) | 20.5 | 20.1 | 21.2 | 20.8 | 21.5 | 20.3 | 20.2 | 19.8 | 20.3 | 19.8 |
| Air content (%) | 5.3 | 5.1 | 5.3 | 4.9 | 5.1 | 5.7 | 4.9 | 5.4 | 5.0 | 5.2 |
| Slump test Immediately after mixing | 18.0 | 17.5 | 17.0 | 17.5 | 17.5 | 16.5 | 6.0 | 20.5 | 10.0 | 21.5 |
| Static slump A (cm) | 13.0 | 14.0 | 14.0 | 13.5 | 12.5 | 15.0 | 4.0 | 18.0 | 6.0 | 14.5 |
| Remix slump B (cm) | 16.0 | 16.5 | 16.0 | 15.0 | 15.5 | 16.0 | 5.5 | 20.0 | 8.0 | 18.5 |
| Slump ratio A/B | 0.81 | 0.85 | 0.88 | 0.90 | 0.81 | 0.94 | 0.73 | 0.90 | 0.75 | 0.78 |
| Bleeding (%) | 0.3 | 0.9 | 0.4 | 1.2 | 1.2 | 0.8 | 0.3 | 0.2 | 0.8 | 1.3 |

TABLE 5

| Ingredients | Comparative Example | |
|---|---|---|
| | 1 | 2 |
| Formulation | 1 | 1 |
| Type of cellulose ether | No. 6 | No. 7 |
| Amount of cellulose ether (g/m$^3$) | 4,800 | 500 |
| Amount of water-reducing agent (%) | 0.5 | 0.5 |
| Amount of AE admixture (%) | — | — |
| Amount of defoamer (%) | 0.08 | 0.02 |
| Results | | |
| Temperature (° C.) | 20.5 | 21.2 |
| Air content (%) | 5.5 | 5.8 |
| Slump test Immediately after mixing (cm) | 17.5 | 16.0 |
| Static slump A (cm) | 6.0 | 6.0 |
| Remix slump B (cm) | 14.0 | 13.0 |
| Slump ratio A/B | 0.43 | 0.46 |
| Bleeding (%) | 5.1 | 1.1 |

As seen from Table 4, when a nonionic water-soluble cellulose ether having a desired viscosity is added in a desired amount, the resulting concrete composition has a high slump ratio and low percent bleeding. This indicates that the concrete composition maintains stable flow for a certain time and is unsusceptible to segregation, demonstrating improved pumping ability and workability.

By contrast, the concrete composition of Comparative Example 1 in Table 5 which uses a nonionic water-soluble cellulose ether having an aqueous solution viscosity below the specific range, shows a low slump ratio and high percent bleeding. The concrete composition of Comparative Example 2 which uses a nonionic water-soluble cellulose ether having an aqueous solution viscosity above the specific range, shows a low slump ratio and low percent bleeding.

Japanese Patent Application Nos. 2014-093585 and 2014-129774 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A concrete composition comprising a nonionic water-soluble cellulose ether, water, cement, a fine aggregate, and a coarse aggregate, wherein the nonionic water-soluble cellulose ether has a 2 wt % aqueous solution viscosity of 3 to 1,000 mPa·s at 20° C. and the concrete composition has a slump ratio (AB) of at least 0.60, wherein A is a static slump value of the concrete composition, B is a remix slump value of the concrete composition, and both the static slump value and the remix slump value are measured according to JIS A 1101.

2. The concrete composition of claim 1, which immediately after mixing, has a slump value of 5 to 24 cm as measured according to JIS A 1101.

3. The concrete composition of claim 1 wherein the nonionic water-soluble cellulose ether is added in an amount of 0.01 to 5 kg per cubic meters of the concrete composition.

4. The concrete composition of claim 1 wherein the nonionic water-soluble cellulose ether is hydroxypropyl methyl cellulose, hydroxyethyl methyl cellulose or hydroxyethyl cellulose.

5. The concrete composition of claim 1, having a water/cement ratio in the range of 35 to 72% by weight.

* * * * *